United States Patent [19]
Paul et al.

[11] Patent Number: 6,086,248
[45] Date of Patent: Jul. 11, 2000

[54] PROCESS FOR THE MODEL-SUPPORTED SIMULATION OF THE COOLANT TEMPERATURE IN THE CASE OF A VEHICLE BASED ON INITIALLY MEASURED CONDITIONS

[75] Inventors: Manfred Paul, Dachau; Michael Wuertenberger, Unterhaching, both of Germany

[73] Assignee: Bayerische Motoren Werke Aktiengesellschaft, Munich, Germany

[21] Appl. No.: 08/884,670

[22] Filed: Jun. 27, 1997

[30] Foreign Application Priority Data

Jun. 27, 1996 [DE] Germany ............... 196 25 889

[51] Int. Cl.[7] .................. G01K 1/20; G01K 3/00
[52] U.S. Cl. ........................ 374/145; 374/102
[58] Field of Search ............... 374/145, 169, 374/102, 144, 103, 104, 101, 141, 163

[56] References Cited

U.S. PATENT DOCUMENTS

| | | | |
|---|---|---|---|
| 4,556,029 | 12/1985 | Yamaguchi et al. | 123/41.15 |
| 5,020,007 | 5/1991 | Wu et al. | 702/34 |
| 5,319,963 | 6/1994 | Benford | 374/141 |
| 5,647,669 | 7/1997 | Schnaibel et al. | 374/144 |
| 5,711,605 | 1/1998 | Reher et al. | 374/141 |
| 5,803,608 | 9/1998 | Randoll et al. | 374/144 |
| 5,895,117 | 4/1999 | Wuertenberger | 374/145 |

FOREIGN PATENT DOCUMENTS 40 18 281  12/1990  Germany.

OTHER PUBLICATIONS

Brennst.–Wärme–Kraft 29 (1977) Nr. 10, Oct., entitled "Die rechnerische Behandlung von Wärmeübertragergruppen" by T. Korpela, pp. 419–423.

*Primary Examiner*—Diego Gutierrez
*Assistant Examiner*—Stanley J. Pruchnic, Jr.
*Attorney, Agent, or Firm*—Evenson, McKeown, Edwards & Lenahan, PLLC

[57] ABSTRACT

A process for the model-supported simulation of the coolant temperature in the case of a vehicle is provided. Conventionally, two temperature sensors are used for determining the coolant temperature, in which case one exists only for determining the temperature when an engine is switched off. Such an additional sensor is cost-intensive and should be avoided. The process avoids using an additional sensor by detecting the coolant temperature at the point in time of the switching-off of the driving engine. A current coolant temperature is continuously calculated while including vehicle-specific data using a temperature model. As an alternative, the current coolant temperature is not continuously calculated, but rather is calculated from a point in time as of which a theoretically determined coolant temperature falls below a specific value.

10 Claims, 2 Drawing Sheets

PROCESS FOR THE MODEL-SUPPORTED SIMULATION OF THE COOLANT TEMPERATURE IN THE CASE OF A VEHICLE BASED ON INITIALLY MEASURED CONDITIONS

BACKGROUND AND SUMMARY OF THE INVENTION

The invention relates to a process for the model-supported simulation of the coolant temperature in the case of a vehicle.

In the case of conventional vehicles, the coolant temperature must be known, for example, for the operation of the engine, the air-conditioning or heating system, or outside temperature measuring. For this purpose, the temperature of the coolant is sensed by at least one sensor.

In modern vehicles, the sensor emits a signal by way of a data bus to individual control devices in a motor vehicle. However, this data bus is often not operated before the terminal 15 "on" (condition corresponding to the ignition being "on"). However, the coolant temperature must be known before terminal 15 "on" for operating vehicle devices or for determining other quantities such as, for example, of the air-conditioning and heating system or of the outside temperature. For this reason, a second sensor is conventionally provided whose signal emits, already before terminal 15 "on" (thus before the ignition is switched on), a signal which corresponds to the coolant temperature. On the basis of this signal, the corresponding apparatuses, such as the air-conditioning system and the heating devices, can then be operated.

A disadvantage in this case are the additional costs for the use of a second sensor.

It is an object of the present invention to avoid using sensors for detecting the coolant temperature which are superfluous for cost and space reasons.

This object is achieved by a process for the model-supported simulation of the coolant temperature in the case of a vehicle. *The process detects the coolant temperature at the point in time of the switching-off of the driving engine, and continuously calculates the current coolant temperature while including vehicle-specific data using a temperature model. The object is further achieved by a process for the model-supported simulation of the cooling temperature in the case of a vehicle with the steps of detecting the coolant temperature at the point in time of the switching-off of the driving engine, and determining a point in time as of which a theoretically determined coolant temperature falls below a given limit value using vehicle-specific data and a temperature model.

Corresponding to the process according to the invention, the coolant temperature is sensed at the point in time of the switching off of the driving engine. Based on this value, a continuous calculation will then take place of the current coolant temperature including vehicle-specific data with the aid of a temperature model.

Such vehicle-specific data can, for example, be the heat transmission resistance of an engine to a virtual temperature sensor, the heat transmission resistance of such a virtual temperature sensor to the outside environment, a heat transmission resistance between the engine and the outside environment as well as corresponding heat capacities, that is, the heat capacity of the engine or of the engine system and/or of corresponding temperature sensors.

For many purposes, an approximate, for example linear, factoring into account of the corresponding heat transmission resistances or heat capacities will be sufficient. A linear transmission function could be implemented on a model of the first order. However, if additional influences, such as the wind, environmental influences, locations, etc., are also to be taken into account, preferably higher orders could be taken into account in the case of the models (transmission functions), that is, non-linear heat transmission resistances/capacities.

Preferably, the heat transmission resistance and/or capacity values are determined experimentally.

Conventionally, in the case of a vehicle, after the engine is switched off, the outside temperature sensing is discontinued and the temperature value is frozen at the last-sensed value. However, for the present invention, this will take place only if the temperature value changes upwardly. When the outside temperature value changes in the downward direction, no freezing will take place. The reason for this is that a control of the heating system, for example, takes place in accordance with the difference between the outside temperature and the coolant temperature and, particularly after the switching-off of the engine, the coolant temperature rises for a short time because of temperature coasting. When the coolant temperature then falls below a predetermined limit value after a certain time period, the lock for sensing the outside temperature is canceled and its value is indicated correspondingly.

As an alternative, in the case of another process according to the invention, the point in time is determined as of which a theoretically determined coolant temperature falls below a given limit value. This takes place by factoring into account vehicle-specific data and by using a temperature model. With the falling below of the theoretically determined limit value—as indicated above—a lock can be released again.

The point in time as to when the limit value is crossed can preferably be determined in that it is read out of a table in which specific operating and/or environmental conditions as well as vehicle-specific conditions are assigned to the corresponding points in time. In addition, estimated time constants as a function of the environment and of the vehicle type can also be stored in such tables.

Another embodiment consists of calculating the point in time by including operating, environmental and/or vehicle-specific conditions. Such a calculation is possible in an approximate manner, for example, by the formula $$t_w = -T \ln (10/\Delta T),$$

wherein T is the coolant temperature at the point in time of the switching-off of the engine and $\Delta T$ is the temperature difference between the coolant temperature and the temperature of the outside environment.

Other objects, advantages and novel features of the present invention will become apparent from the following detailed description of the invention when considered in conjunction with the accompanying drawings.

DETAILED DESCRIPTION OF THE DRAWINGS

Figure 1:
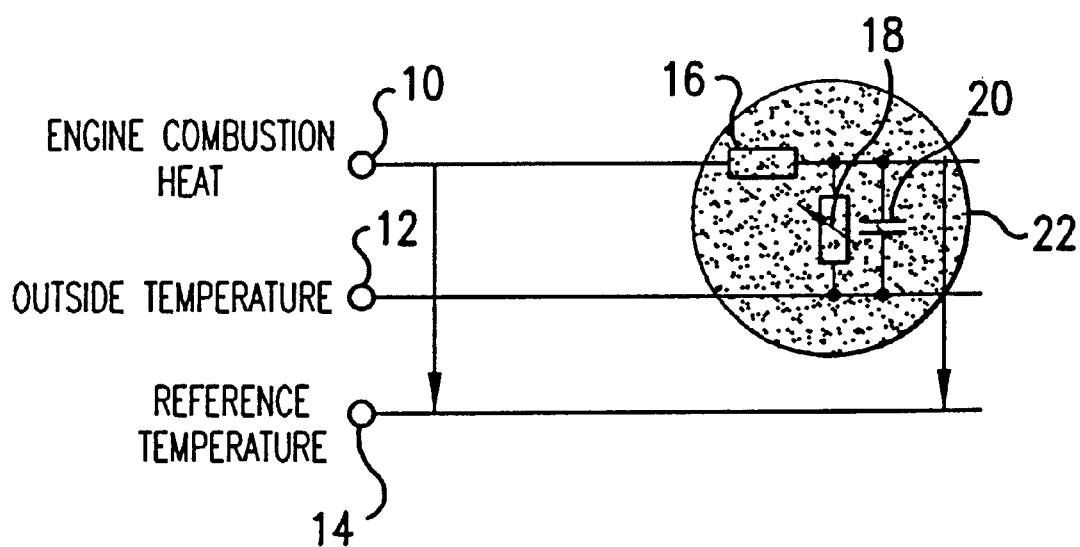
FIG. 1 is a schematic diagram illustrating a heat transmission model.

Referring to FIG. 1 in this case, three lines are illustrated which are arranged above one another and which are to represent corresponding heat levels; specifically, the line indicated by reference number 10 is to represent the level of the engine combustion heat; the line indicated by reference number 12 is to represent the outside temperature; and the line indicated by reference number 14 is to indicate the reference temperature.

In the manner of an electric circuit diagram, reference number 16 represents a heat transmission resistance between the engine and the coolant circulating system. A variable heat resistance 18 is simulated for the heat transmission from the engine system to the outside.

In parallel to the variable heat resistance 18—also in the manner of an electric circuit diagram—, a heat capacitance 20 of the engine is switched which comprises the heat storage capacity of the engine block, with the coolant circulating system and similar accessories.

On the whole, the circled area 22 therefore forms a temperature model by which heat transmission can be determined between different vehicle parts or between vehicle parts and the outside environment. Thus, the temperature at individual vehicle areas can be determined.

In particular, in the manner of a model, the coolant temperature after the switching-off of the vehicle engine can be simulated, including the vehicle-specific data which, in the illustrated figure, are represented by the corresponding heat transmission resistances and capacitances.

In this case, an additional sensor can be replaced which is conventionally arranged for supplementing another coolant temperature sensor provided for the driving operation of the vehicle.

Previously, two sensors had been used because a first sensor is connected with a data bus of a motor vehicle which can transmit its data to corresponding devices in the motor vehicle only starting from an "ignition on" signal (terminal 15 active).

In order to be able to use the coolant temperature even before the ignition of the motor vehicle is switched on, a second sensor had been used. This has a negative effect for reasons of costs and also for reasons of space in the engine compartment.

The coolant temperature value is needed before the ignition is switched on since, for example, because of the difference between the coolant temperature and the outside temperature, a damping time constant is determined by which an indication of the temperature signal takes place and reflects the outside or coolant temperature.

A possible damping time constant for the outside temperature indication will be explained in the following through the use of an example.

When the vehicle is stopped and there is only a small difference between the outside temperature and the coolant temperature, a damping time constant of approximately 1 hour is used. When, by contrast, the difference between the outside temperature and the coolant temperature is large while the vehicle is stopped, a damping value of approximately 11,000 hours is used.

In the case of the indicated process, the sensor which is active before the switching-on of the ignition will now be replaced by a model-supported system for simulating the coolant temperature.

In this case, in a first step, the thermal behavior of the measuring system is described by an alternative model, as illustrated in the drawing. This model has the purpose of exactly describing the systematic errors which occur by the heating of the sensor via the engine heat.

The cooling action of the engine can be approximated by a linear transmission function of the first order. This is only an approximation for a standard situation because outside influences, such as wind, environment, locations, etc. are not taken into account. For taking those influences into account, transmission functions of a higher order (non-linear heat resistances/capacities) may possibly be used.

The present case requires only a qualitative assessment of the temperature difference between the coolant temperature and the outside temperature. This approximation is therefore sufficient.

A table was established in practice by means of eight cooling tests which shows time constants for different vehicle and environmental conditions.

The time $t_w$ required until this temperature difference is reached can be calculated from the standard cooling time T and the temperature difference $\Delta T$ existing at the start of the standard test, according to the formula $$t_w = -T \ln (10/\Delta T)$$

This results in the time $t_w$ as of which time a theoretically determined coolant temperature falls below a given limit value.

As an alternative, a table can naturally also be established which, by means of the environmental and/or vehicle-specific parameters, indicates the point in time as of which the coolant temperature falls below a specific limit value.

Finally, as an alternative, the approach may also be selected of continuously calculating the coolant temperature by means of the given heat transmission resistance and/or heat capacitance values according to the model indicated in the drawing. The advantage of the latter process consists of the fact that the coolant temperature would then be available at any point in time (also when the engine is switched off), whereas, in the first two processes, only a point in time would be indicated in which a theoretically determined coolant temperature value falls below a predetermined limit value.

However, all of the above-mentioned processes have the advantage that one sensor can be eliminated. This has a positive effect on the costs as well as on the space available in the engine.

Figure 2:
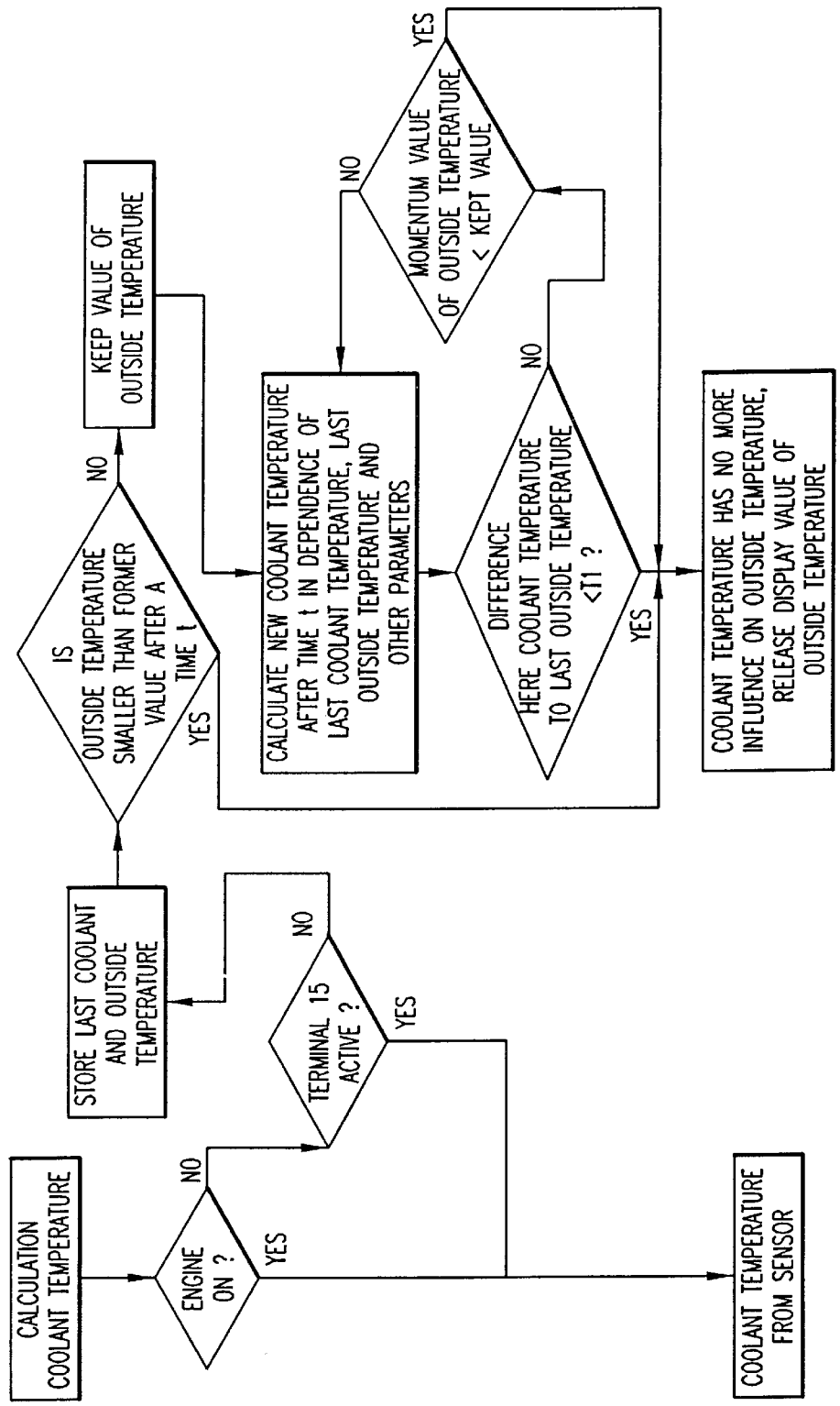
FIG. 2 is a flow chart of an example of a coolant temperature calculation.

Referring to FIG. 2, there is shown an example of a coolant temperature calculation according to the invention. Beginning in the upper left corner of FIG. 2, the calculation of the coolant temperature is first performed by determining whether either the engine is "on", or whether terminal 15 is "active". If the engine is either on or terminal 15 is active, then the coolant temperature is obtained from the sensor. However, if the engine is off and terminal 15 is not active, then the process operates to store the last coolant and outside temperature values. Next, the process determines after a certain time period "t", whether the outside temperature is less than a former value.

If the outside temperature after time "t" is not less than the former value, then the process maintains the value of the outside temperature and, next, calculates a new coolant temperature after the time "t" in dependence on the last coolant temperature, the last outside temperature, and certain other parameters of the model.

After that, the process checks if the difference between the new coolant temperature and the last outside temperature is smaller than a value "$T_1$". If that is not the case, then the process checks if the momentary value of the outside temperature is smaller than the kept value. Again, if that is also not the case, then the process proceeds to make a new calculation of the coolant temperature as shown by the loop on the right hand side of FIG. 2.

However, if either the outside temperature is smaller than the former temperature value after the time "t", or the difference between the new coolant temperature and the last outside temperature is smaller than "$T_1$", or still further if the momentary value of the outside temperature is smaller than the kept value, then the process proceeds to the point that the coolant temperature no longer has an influence on the outside temperature. Then, the process proceeds to display the value of the outside temperature.

Of course it will be understood that the process according to the invention can readily be performed using a processor of the engine control unit for example. The programming of the processor can be performed by one skilled in the art in accordance with the above teachings.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for estimating a coolant temperature of a vehicle engine which is in a switched-off state, the process comprising the acts of:

measuring the coolant temperature at a point in time when the engine is switched off;

calculating the coolant temperature at a later point in time after the engine is switched-off based on the measured coolant temperature and on vehicle-specific data using a temperature model.

2. A process according to claim 1, wherein the calculating act comprises the act of:

continuously calculating a current coolant temperature after the engine is switched off based on the measured coolant temperature while including the vehicle-specific data using the temperature model.

3. The process according to claim 2, wherein said included vehicle-specific data factors into account at least one of a heat transmission resistance of the driving engine to a virtual temperature sensor, a heat transmission resistance of the virtual temperature sensor to an outside environment, a heat transmission resistance between the driving engine and the outside environment, and a heat capacitance of a corresponding vehicle part.

4. The process according to claim 3, wherein only transmission functions of a first order are factored into account with respect to said heat transmission resistances and said heat capacitance.

5. The process according to claim 4, wherein additionally transmission functions of a higher order and non-linear characteristics are factored into account with respect to said heat transmission resistances and said heat capacitance.

6. The process according to claim 3, wherein at least one of a heat transmission resistance value of said heat transmission resistances and a heat capacity value of said heat capacitance are experimentally determined.

7. A process according to claim 1, wherein the calculating act comprises the act of:

determining the later point in time at which a theoretically determined future coolant temperature value falls below a given limit value using the vehicle-specific data and the temperature model.

8. The process according to claim 7, wherein said further point in time is read out of a table in which at least one of specific operating and environmental conditions, as well as said vehicle-specific data, are assigned to corresponding points in time.

9. The process according to claim 7, wherein said further point in time is calculated while including at least one of operating, environmental, and vehicle-specific conditions.

10. The process according to claim 9, wherein said calculating act is performed in accordance with $$t_w = -T \ln (10/\Delta T),$$

wherein T is the coolant temperature at the point in time of the switching-off of the driving engine and $\Delta T$ is a temperature difference between the coolant temperature and a temperature of an outside environment.

* * * * *